(12) United States Patent
Gill

(10) Patent No.: US 7,458,902 B2
(45) Date of Patent: Dec. 2, 2008

(54) CHANGEABLE GOLF GRIP

(75) Inventor: David Keith Gill, Pinehurst, NC (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 11/724,062

(22) Filed: Mar. 14, 2007

(65) Prior Publication Data

US 2008/0227562 A1 Sep. 18, 2008

(51) Int. Cl.
*A63B 53/16* (2006.01)

(52) U.S. Cl. .......................... 473/299; 473/300

(58) Field of Classification Search ......... 473/300–303, 473/296, 298–299
See application file for complete search history.

(56) References Cited

U.S. PATENT DOCUMENTS

| | | | | |
|---|---|---|---|---|
| 3,897,058 A | 7/1975 | Koch | | 273/26 |
| 4,195,837 A | 4/1980 | Poulin | | 273/81 |
| 4,365,807 A | 12/1982 | Melby | | 273/81 |
| 4,429,875 A | 2/1984 | Stanton | | 273/81.2 |
| 4,669,726 A | 6/1987 | Lempio | | 273/81.2 |
| 4,826,168 A | 5/1989 | McGuire et al. | | 273/81.2 |
| 5,029,860 A | 7/1991 | Ehrich | | 273/81.2 |
| 5,299,802 A | 4/1994 | Bouchet-Lassale | | 273/81.4 |
| 5,328,174 A | 7/1994 | Reeder | | 273/162 |
| 5,374,064 A | 12/1994 | Barber | | 273/194 |
| 5,513,845 A | 5/1996 | Sonagere | | 473/206 |
| 5,540,625 A | 7/1996 | Koch et al. | | 473/318 |
| 5,653,645 A | 8/1997 | Baumann | | 473/305 |
| 5,944,617 A * | 8/1999 | Falone et al. | | 473/300 |
| 5,976,031 A | 11/1999 | Johnson | | 473/300 |
| 6,213,891 B1 | 4/2001 | Moore | | 473/300 |
| 6,743,116 B2 * | 6/2004 | Wilbur | | 473/296 |
| 6,749,521 B1 * | 6/2004 | Benson | | 473/239 |
| 6,857,971 B2 * | 2/2005 | Huang | | 473/300 |
| 7,074,135 B2 | 7/2006 | Moore | | 473/296 |
| 7,172,514 B2 | 2/2007 | Benson | | 473/239 |
| 7,175,538 B2 | 2/2007 | Miller | | 473/300 |
| 7,264,556 B1 * | 9/2007 | Divisconti | | 473/296 |
| 2002/0082103 A1 * | 6/2002 | Benson | | 473/239 |
| 2004/0198529 A1 | 10/2004 | Moore | | 473/300 |
| 2005/0227776 A1 * | 10/2005 | Benson | | 473/239 |

OTHER PUBLICATIONS

Golfweek Magazine Dated Mar. 10, 2007: p. 62—Article Entitled USGA's New Rule: Change is Good; Author: James Achenbach.*
Golfweek Magazine Dated Mar. 10, 2007; p. 62—Article Entitled USGA's New Rule: Change is Good; Author: James Achenbach.

* cited by examiner

*Primary Examiner*—Stephen L. Blau
(74) *Attorney, Agent, or Firm*—Daniel S. Kalka

(57) ABSTRACT

A changeable grip 20 for a shock imparting implement grip has a body 22, ferrule element 24, and a sleeve 26. The body 22 and sleeve 26 portions of the grip are threadably connected to the ferrule element 24 which is attached to the shaft 14 of a shock imparting implement.

18 Claims, 4 Drawing Sheets

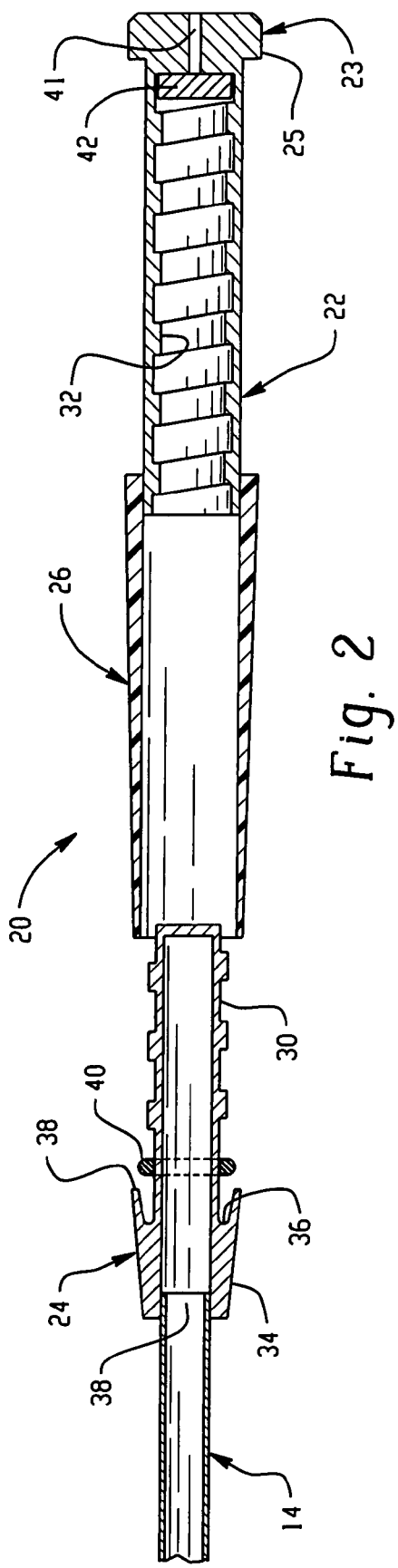
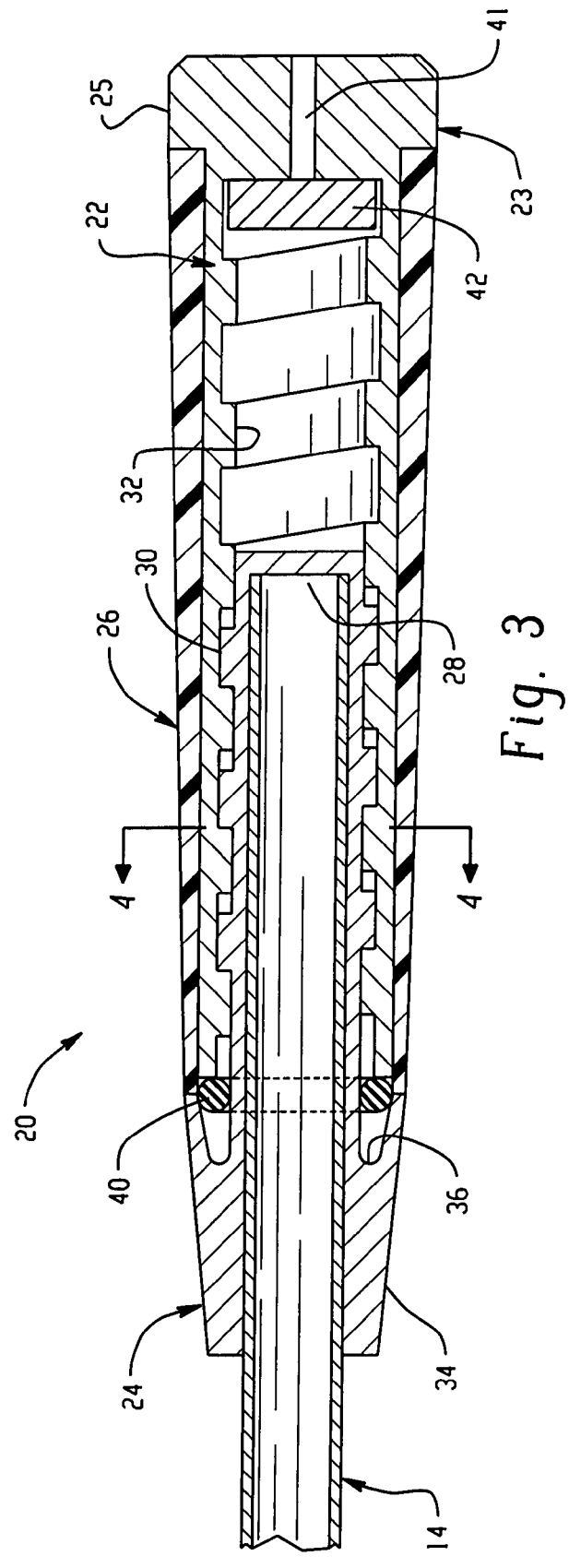

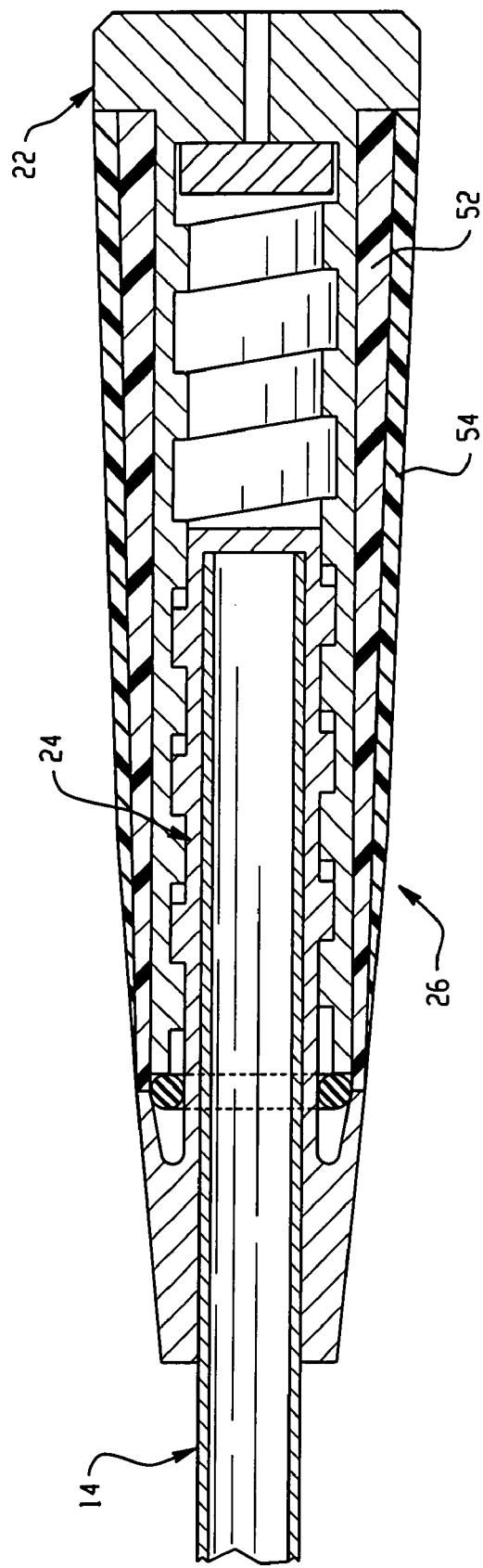
Fig. 6
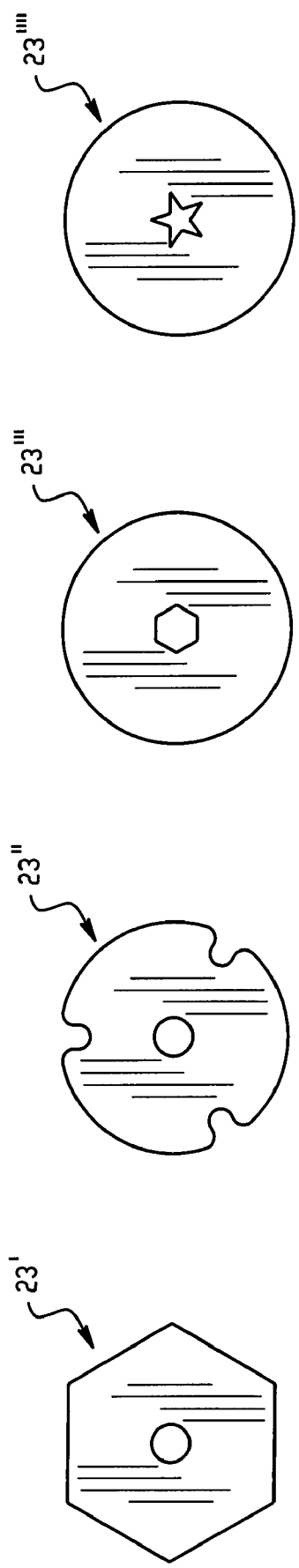
Fig. 7
Fig. 8
Fig. 9
Fig. 10

CHANGEABLE GOLF GRIP

FIELD

The present disclosure relates in general to a hand grip or a sports grip, and particularly to a new and improved changeable grip particularly suited as a grip for shock imparting implements.

BACKGROUND

There are many forms of grips available on the market today for a wide variety of implements. These implements can range from hammer handles or other hand tools to sports implements like tennis, squash, or racquetball rackets, or golf clubs. While the present disclosure is particularly suited as a golf club grip and described with particular reference thereto, it should be immediately apparent that the present invention is not intended to be limited only to golf grips and extends to any sports grip or hand grip for a shock imparting implement.

Originally, golf club grips consisted primarily of a leather wrap around a handle. Later, molded rubber slip-on grips became available and are still in wide use today. A recent variation on the molded rubber grip is the concept of using a rubber sleeve or underlisting on the handle with a leather or synthetic leather wrap spirally wrapped around the underlisting, or alternatively a single panel cover over the underlisting. Grips are made today from a wide variety in construction and combinations of materials.

There still exists a need for an improved changeable grip that imparts or receives shock or force to or from a shock imparting implement. A changeable grip provides greater flexibility in selecting a specific grip for a given application or for use under a wide variety of conditions. It allows the user to select exactly the type of grip needed under the given conditions for the desired application. It is also desirable for the grip to be constructed in a manner that provides a firm grasp with little or no slippage and with good resistance to torque as well as exhibiting good shock absorbing qualities.

A changeable grip further allows for a wide variety of enhancing features to the grip such as the addition of a vibration damper for example, or added weights for swing weight control, or even still multiple types of gripping surfaces with interchangeable sleeves of combinations of various materials. Swing weight control, handle stiffness, flex control, shock absorption are just some of the important factors in improving the impact from the implement. The concept of tailoring a grip to provide the user with multiple options minimizes the need for multiple grips and multiple implements.

Thus, it is desirable to have a changeable grip that allows the user to select the right fit and feel for the handle or shaft of a shock imparting implement or tool to meet the needs of the user in a given application.

BRIEF SUMMARY OF THE DISCLOSURE

The present disclosure describes a changeable grip for a shock imparting implement that offers a wide variety of features.

The improved changeable grip according to the present disclosure includes a body that forms an upper portion of the grip. The body has a hollow portion with a threaded inner surface at a lower end and includes a cap at an upper end. The body is constructed to engage and mesh with a ferrule element that forms a lower portion of the grip. The ferrule element includes a threaded portion on an outer surface at an upper end of the ferrule element. The threaded portion of the ferrule element meshes with and engages the threaded portion of the body thereby firmly attaching the body to the ferrule element. The ferrule element is attached at its lower end to a shaft of the shock imparting implement. A sleeve is positioned on an outer surface of the body to provide a gripping surface.

The present disclosure also relates to a golf club with a changeable grip.

The various features of novelty which characterize the present disclosure are pointed out with particularity in the claims annexed to and forming a part of this disclosure. For a better understanding of the present disclosure and its operating advantages attained with its use, reference is made to the accompanying drawings, and descriptive matter.

BRIEF DESCRIPTION OF THE DRAWINGS

FIG. 2 is a sectional view of a partially disassembled changeable golf grip according to one embodiment of the present disclosure;

FIG. 3 is a sectional view of the assembled grip shown in FIG. 2;

FIG. 6 is a sectional view similar to FIG. 2 depicting another embodiment of the present disclosure;

FIG. 7 is a top view of the cap;

FIG. 8 is a view similar to FIG. 7 depicting another embodiment of the cap;

FIG. 9 is a view similar to FIGS. 7 and 8 depicting still another embodiment of the cap; and FIG. 10 is a view similar to FIGS. 7-9 depicting yet another embodiment of the cap.

DETAILED DESCRIPTION OF THE DISCLOSURE

Figure 1:
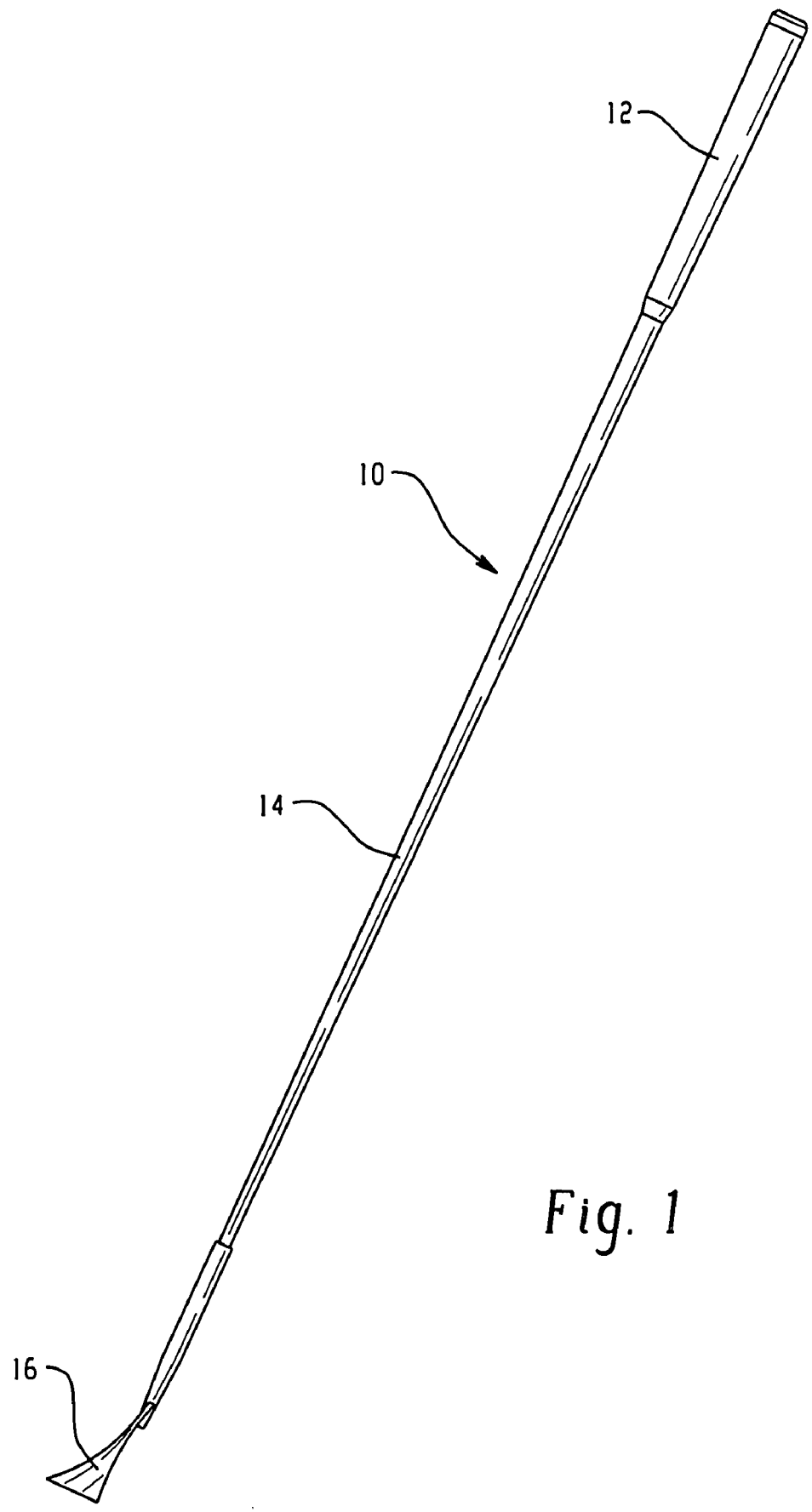
FIG. 1 is an elevated perspective view of a golf club.

Referring to the figures, which are not intended to limit the present disclosure, and where like numerals designate like or similar features throughout the several views, and first in particular to FIG. 1, there is shown a golf club generally designated 10. Golf club 10 includes a golf club grip 12, a shaft or handle 14, and a club head 16 in its most basic form. A golf club is but one example of a shock imparting implement. There are many other examples of shock imparting implements known in the art. The term "shock imparting implement" as used herein is meant to include sporting implements and tools that are used to strike, impact, or apply a force to an object or an implement, or conversely receive an impact or force from the implement. Tennis racquets, squash racquets, racquetball racquets, lacrosse grips, fishing rod handles, bicycle handles, motorcycle handles, gear shift levers, and baseball grips are but only a few examples meant to be included in the term "shock imparting implements". Naturally there are many others, and even possibly more sport items that may still be developed. All of these are envisionable within the scope of the present disclosure. The term "shock imparting implements" is also meant to include but not be limited to tool handles such as a hammer handle or a screwdriver handle.

The golf club grip 12 shown in FIG. 1 is what is generally known in the art as a slip-on style golf club grip. The term "slip-on" simply refers to a grip that is designed to slide onto a handle or shaft 14 and be secured thereto by an adhesive, tape, or combination thereof. These types of grips are widely used today for many shock imparting implements. Most grips are made of some type of an elastomeric material like a rubber compound, a synthetic plastic or rubber, thermoplastic material, and may contain fibers or cords imbedded therein for a better gripping surface. While golf club grip 12 is removable from the shaft 14 of the golf club 10, the grip 12 cannot be re-used since the grip 12 is cut away from the shaft when it is time to replace the grip.

Referring to FIG. 2, there is shown a sectional view of a partially disassembled changeable grip generally designated 20 according to the present disclosure. The changeable grip 20 basically comprises three parts or elements: a body 22, a ferrule element 24, and a sleeve 26. The body 22 is threadably attached to the ferrule element 24 which is mounted on the golf club shaft 14. A sleeve 26 covers the body 22. As will be explained in greater detail later herein with respect to each of these three parts, there are a wide variety of options and enhancing features that these three parts provide the user.

The ferrule element 24 is securely attached to the upper end 28 of a modified (reduced length) golf club shaft 14. An upper end 30 of the ferrule element 24 has a male threaded portion constructed to threadably receive a female threaded inner surface 32 of the body 22. The threaded portions 30, 32 of the ferrule element 24 and body 22 preferably are square threads but any conventional threading of these components are suitable as long as they function to secure the body 22 to the ferrule element 24. Ferrule element 24 has a tapered lower end 34 that tapers in the direction of the golf club head. An annular groove 36 in a top edge 38 of the lower end 34 of the ferrule element is particularly suited for a lock washer 40 to maintain the secure attachment of the body 22 to the ferrule element 24. Lock washer 40 may be made of any suitable material and/or shape for this purpose including but not limited to being made of an elastomeric or metal material. The ferrule element 24 and the body 22 of grip 20 are made from a metal like stainless steel or titanium, or a metal alloy, or a composite material like a carbon fiber, graphite fiber, or metal matrix composite. Any similar lightweight high strength material is well suited for this purpose.

Body 22 preferably includes an integral or detachable cap 23 at its upper end. Cap 23 has a radially extending shoulder 25 that facilitates securing the sleeve 26 on the body 22 by the compressive force of the shoulder 25 pushing the sleeve 26 against the ferrule element 24. The lock washer 40 provides axial force between the body 22 and the ferrule 24 using the groove 36. Cap 23 has preferably a substantially cylindrical shape, but it is envisionable that the cap 23 can have other forms including but not limited to an oval, hexagonal, octagonal, square, or various other shapes. Cap 23' with a hexagonal shape is depicted in FIG. 7. As should be immediately apparent from FIGS. 8 through 10, other embodiments of cap 23 (23", 23''' and 23'''') are envisionable. These and other embodiments are intended to be within the scope of this disclosure. Cap 23 in other embodiments can be constructed as described and disclosed in U.S. patent application Ser. No. 11/607,707, which is assigned to the assignee of this application, and hereby incorporated by reference. Still, in another embodiment the cap 23 may be threadably attached to the body 22. In any of these embodiments, an optional selected mass 42 which may either be a weight or vibration dampener such as an anti-vibration plug, or even both a weight and an anti-vibration plug as described in U.S. patent application Ser. No. 11/607,707, can be fitted within body 22, or within the cap 23. An optional opening 41 is typically provided approximately through the center of the cap 23 and may continue through the selected mass 42 for use in placing and holding the selected mass 42 for example with a threadable attachment (not shown). When the selected mass 42 is a weight, the weight 42 is preferably a tungsten material that can range from approximately one gram to approximately fifteen hundred (1500) grams depending upon the user and the application. More preferably, the weight will range from approximately ten grams to approximately forty grams for use in a golf club. In other embodiments, the weight may be encapsulated within a detachable cap 23 as described in U.S. patent application Ser. No. 11/607,707.

As mentioned previously, an advantage of the changeable design of the improved grip 20 in the instant disclosure is the option of using an anti-vibration plug for the selected mass 42 instead of a weight or even in combination with the weight. As should be immediately apparent, anti-vibration plug 42 may have a weight contained therein if desired, and be of any length providing it fits within the body 22, or within the shaft 14. By adjusting the length of the anti-vibration plug 42, the user can select the amount of vibration dampening desired. The advantage of using the anti-vibration plug with a separate weight is the ability to make the anti-vibration plug with more elastomeric material for absorbing shock and dampening vibration. These advantages and others as well as a suitable construction are described in much greater detail in the incorporated U.S. patent application previously referenced.

Figure 4:
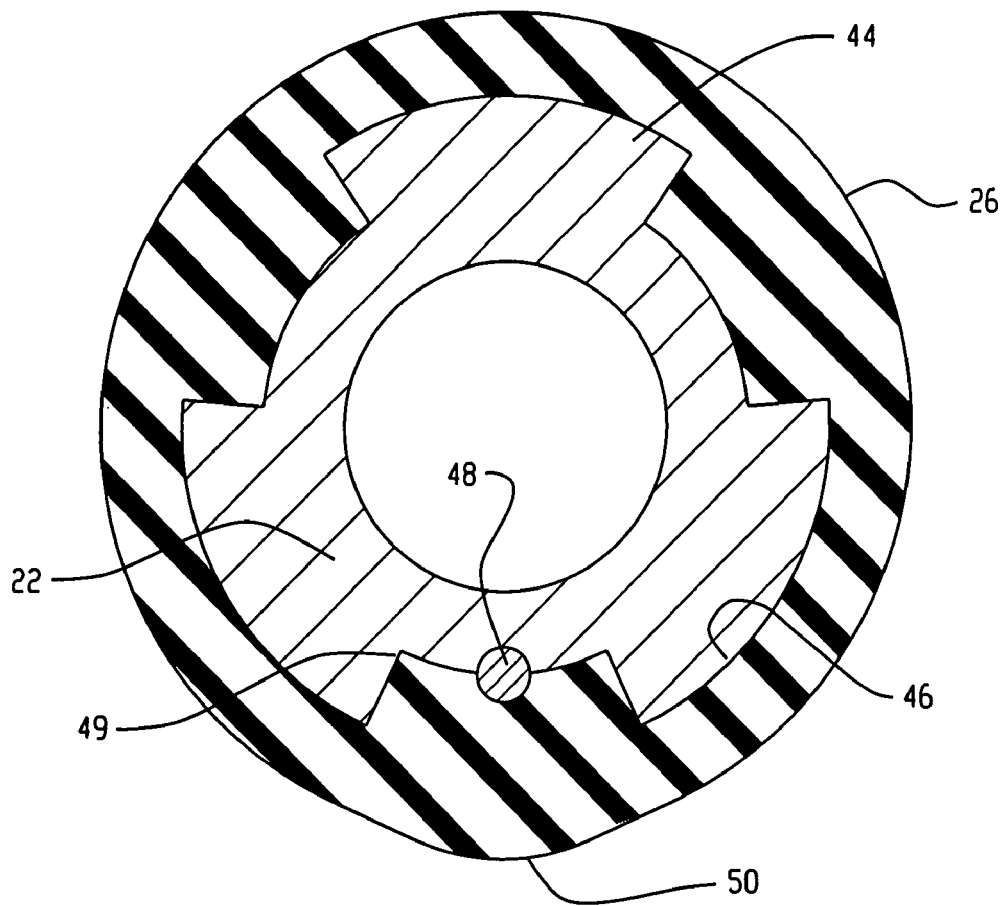
FIG. 4 is a sectional view taken along lines 4-4 of the grip shown in FIG. 3.
Figure 5:
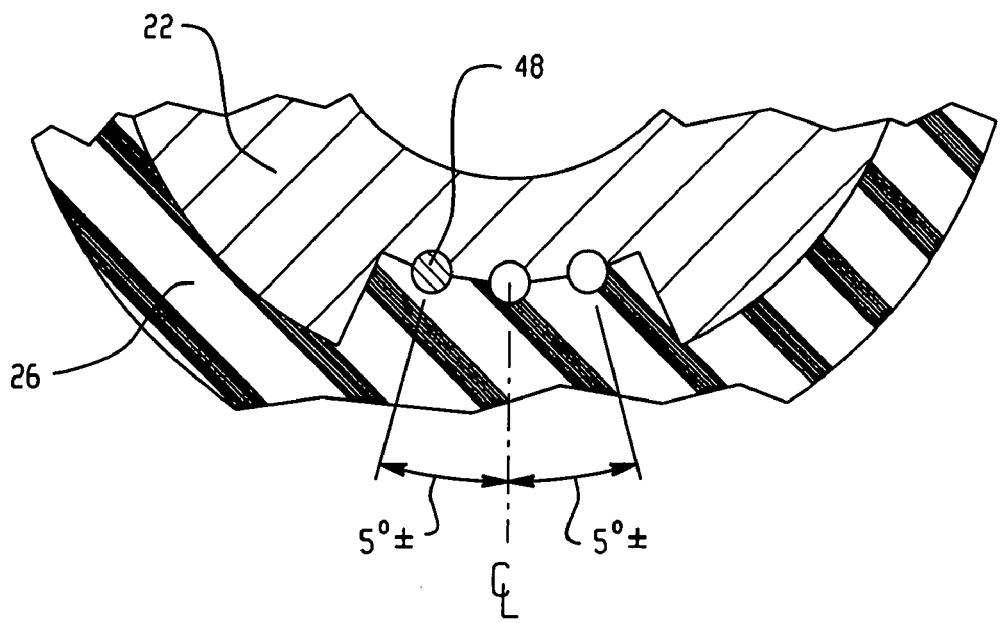
FIG. 5 is a partial sectional view similar to FIG. 4 depicting alternate embodiments.

Turning now to FIG. 4, a plurality of spaced splines or ribs 44 extend longitudinally along the outer surface of the body 22 and mesh with corresponding channels 46 in sleeve 26. These splines prevent the sleeve 26 from slipping or rotating during physical activity. In one embodiment, an optional elongated rod 48 which may be a metal wire, rod, or an elastomeric line or rod is positioned fairly centrally on one of the ridges 49 of the sleeve 26 between the splines 44 to form a reminder rib 50 in the grip 20. A reminder rib 50 is a device known and used by some golfers for facilitating their hand placement on the grip. The location of the reminder rib 50 is adjustable by positioning the rod 48 in a range of approximately five degrees to approximately fifteen degrees on either side of the center position of the ridge 49. FIG. 5 depicts this feature with the rod positioned on either side of the center position at approximately five degrees, but it should be understood that this range can extend as much as approximately fifteen degrees.

The sleeve 26 can comprise one or more layers of a rubber, elastomeric, or thermoplastic material, or combinations of such materials. These layers can be arranged to provide varying durometer values. A durometer value or rating is an international standard for the hardness measurement of rubber, plastic and other non-metallic materials. Durometer values and ratings are described in the American Society for Testing and Material specification ASTM D2240. For example in one embodiment, an inner surface 52 of the sleeve that fits snugly on the body has a hardness value ranging from approximately twenty-five to approximately fifty Shore A hardness. The outer surface or layer 54 of sleeve 26 can have a durometer value preferably ranging from approximately twenty-five to approximately ninety Shore A. Any combination of durometer values may be used depending upon the user's desire for a surface grip feel with good frictional qualities and tactile feel coupled with a firmer inner section. Other known grip materials for sleeve 26 include cord impregnated rubber, thermoplastic materials, silicone materials, leather, carbon Kevlar, natural and synthetic rubbers, or combinations thereof.

Replacement golf grips are quite common in the golfing industry and the procedure for replacing golf grips is well known. The improved changeable grip 20 of the present disclosure allows the user to select the optimum weight, feel, look, moisture absorbent, anti-vibration plug, and the total mass for a given application. The concept of this disclosure to alter or tune the swing weight, club moment of inertia, shaft stiffness or flex, club center of gravity, and increase torsional rigidity of the grip and shaft system. The changeable grip according to the present disclosure allows the user to remove the body 22, sleeve 26, and any selected mass 42 contained within, together generally designated as changeable elements 60, from the ferrule element 24 on a golf club. The user can then modify any of the changeable elements 60 individually or in combination. One of the advantages of the grip according to the subject disclosure is that separate elements of the changeable elements 60, like a new sleeve 26 or a different selected mass 42, may be changed. This ability to modify the various elements of the grip as described above allows the user to tune the implement to their particular feel for a wide variety of differing conditions or environments. This further allows the user to select a wide variety of various shafts for a given application since the grip 20 is compatible with any shaft having the ferrule element 24. The body element 60 can also be provided with different lengths to be used with a common sized shaft.

In still other embodiments, the fixed ferrule element may have a reduced inner diameter to allow for customization of fit on a wide variety of shafts varying length, composition, or diameter. This flexibility allows various types of material and lengths of shafts to be used with the changeable grip 20. The shaft 14 could be a metal or metal alloy material, or alternatively a carbon or graphite fiber composite, or even a metal matrix composite. As a result, the amount of inventory is greatly reduced and the flexibility greatly increased. In addition, a shaft constructed to have changeable club heads allows for numerous variations and possibilities with changeable grips as well.

While specific embodiments of the disclosure have been shown and described in detail to illustrate the application of the principles of this disclosure, it will be understood that there may be other embodiments based on this without departing from such principles.

I claim:

1. A changeable golf club grip comprising:
   a body forming an upper portion of the grip, said body having a hollow portion with a threaded inner surface at a lower end, said body having a cap at an upper end;
   a ferrule element forming a lower portion of the grip, said ferrule element having a threaded portion on an outer surface of an upper end of said ferrule element, said threaded portion being constructed for engagement with said threaded inner surface of said body, said ferrule element having a lower end constructed to attach to a shaft of a golf club wherein said lower end of said ferrule element comprises an annular groove in a top ridge of said lower end, and a washer is disposed therein; and
   a sleeve covering said body for providing a gripping surface.

2. A changeable grip according to claim 1, wherein an outer surface of of said body further comprises a plurality of spaced splines constructed to mesh with corresponding grooves in the inner surface of said sleeve.

3. A changeable grip according to claim 2, further comprising a rod positioned on a ridge within said sleeve for forming a reminder rib in an outer surface of the grip.

4. A changeable grip according to claim 1, further comprising a selected mass positioned within said hollow body.

5. A changeable grip according to claim 4, wherein said selected mass comprises a vibration dampener disposed within said hollow body.

6. A changeable grip according to claim 4, wherein said selected mass comprises a tungsten weight.

7. A changeable grip according to claim 6, wherein said tungsten weight comprises a weight ranging from approximately 1 gram to approximately 1500 grams.

8. A changeable grip according to claim 4, wherein said selected mass comprises an anti-vibration plug received within a hollow portion of said cap.

9. A changeable grip according to claim 4, wherein said selected mass comprises a weight disposed within a hollow portion of said cap.

10. A changeable grip according to claim 1, wherein said body comprises one or more materials selected from the group consisting of titanium, carbon fiber, graphite fiber, metal matrix composites, and metal alloys.

11. A changeable grip according to claim 1, wherein said sleeve comprises one or more materials selected from the group consisting of an elastomeric material, a thermoplastic material, a synthetic rubber material, a natural rubber material, and a silicone material.

12. A changeable grip according to claim 1, wherein said sleeve comprises at least two materials selected from the group consisting of an elastomeric material, a thermoplastic material, a synthetic rubber material, a natural rubber material, and a silicone material, said at least two materials having different durometer values.

13. A changeable grip according to claim 1, wherein said grip comprises a golf club grip.

14. An improved golf club with a changeable grip, comprising:
   a shaft having an upper and a lower end;
   a club head attached to the lower end of said shaft;
   a ferrule element attached to the upper end of said shaft, said ferrule element having a threaded portion on an outer surface of an upper end of said ferrule element, said ferrule element further having an annular groove in a ridge disposed at an end of said threaded portion nearest the lower end of said shaft;
   an elastomeric washer disposed within said annular groove in said ferrule element;
   a body forming an upper portion of the grip, said body having a hollow portion with a threaded inner surface at a lower end, said threaded inner surface of said body being constructed to threadably engage said threaded portion of said ferrule element for removably attaching said body to said ferrule on said shaft, said body further having a cap at an upper end, said cap having an outer annular shoulder; and
   a sleeve constructed to cover an outer surface of said body between said cap and for providing a gripping surface for the improved golf club.

15. An improved golf club according to claim 14, wherein said sleeve comprises at least two layers of material having different durometer values.

16. An improved golf club according to claim 14, wherein an outer surface of said body comprises a plurality of splines constructed to engage and mesh with corresponding grooves in an inner surface of said sleeve.

17. An improved golf club according to claim 16, further comprising a selected weight disposed within said cap of said body.

18. An improved golf club according to claim 16, further comprising a rod disposed within said grip on a ridge on the inner surface of said sleeve and between said splines on said outer surface of said body for forming a reminder rib on an outer surface of said sleeve.

* * * * *